United States Patent [19]
Walsh et al.

[11] 3,716,825
[45] Feb. 13, 1973

[54] CONTOUR MEASURING APPARATUS ESPECIALLY FOR USE IN A SEA BOTTOM ELEVATION MEASUREMENT

[75] Inventors: George M. Walsh, Middletown; Mark A. Chramiec, Newport, both of R.I.

[73] Assignee: Raytheon Company, Lexington, Mass.

[22] Filed: July 30, 1970

[21] Appl. No.: 64,114

Related U.S. Application Data

[63] Continuation of Ser. No. 785,102, Dec. 19, 1968, abandoned.

[52] U.S. Cl. ............................. 340/3 R, 343/5 CM
[51] Int. Cl. .................................................. G01s 9/66
[58] Field of Search ...... 340/1 R, 3 F, 3 R, 6 R, 16 P, 340/5 H; 343/5 CM, 5 PC, 11

[56] References Cited

UNITED STATES PATENTS 3,400,363 9/1968 Silverman ......................... 340/3 R

2,616,077 10/1952 Holser .............................. 343/5 CM

*Primary Examiner*—Richard A. Farley
*Attorney*—Harold A. Murphy and Joseph D. Pannone

[57] ABSTRACT

A contour measuring apparatus for determining the elevation of sea bottom features with respect to a reference plane. The apparatus comprises means for projecting a burst of acoustic energy upon a subsurface contour. As the burst leading edge and the following elements roll over the sea bottom, respective portions of the burst will be reflected back at an angle $\psi(t)$ which varies as a function of time. When a sudden elevation is encountered, the reflected portions of the echo pulse are reflected at an angle $\psi(t) + \Delta\phi$. Consequently, the signals detected at spaced transducer phase centers will show a change in their phase relationship within a given time interval. As seen at an acoustic receiver the variations in contour elevation $h$ appear as changes in the angle of arrival $\psi(t)$ as represented by the incremental angle $\Delta\phi$. Thus, the receiver signal representation of $\psi(t)$ for a flat horizontal reference plane must be subtracted from $\psi(t) + \Delta\phi$ in order to determine $\Delta\phi$.

8 Claims, 9 Drawing Figures

SYSTEM BLOCK DIAGRAM

FIG. 1A
ELEVATION MEASUREMENT GEOMETRY

FIG. 1B
RELATIVE TIME DELAY VS ARRIVAL ANGLE

FIG. 1C

INVENTORS
GEORGE M. WALSH
MARK A. CHRAMIEC
BY Robert Bruce Brodie
ATTORNEY

FIG. 3
NULL STEERING TO CENTER
OF SWATH $Y_0$

FIG. 4

INVENTORS
GEORGE M. WALSH
MARK A. CHRAMIEC
BY Robert Bruce Brodie
ATTORNEY

FIG. 2
SYSTEM BLOCK DIAGRAM

CONTOUR MEASURING APPARATUS ESPECIALLY FOR USE IN A SEA BOTTOM ELEVATION MEASUREMENT

This application is a continuation of application Ser. No. 785,102, filed on Dec. 19, 1968, and now abandoned.

BACKGROUND OF THE INVENTION

This invention relates to contour measuring apparatus and, more particularly, to the determination of the elevation of sea bottom features with respect to a reference plane.

When an acoustic signal is projected upon a surface, the echo signal magnitude represents the degree of reflectivity of the illuminated surface and the amount of loss occurring in the transmission medium. In contrast, the geometry of a surface, i.e., slope and elevation has generally been determined by measurement of the time interval between the transmission of an illuminating energy pulse and the reception of the echo. For purposes of navigation or underwater construction, the surface geometry is frequently of greater significance than the reflectivity.

In the prior art, depth sounding was the principal technique for obtaining precise and detailed contour information of the ocean bottom. At the same time, side looking sonar devices measured bottom reflectivity changes by recording the acoustic signal energy reflected from the bottom surface features within an acoustic beam directed downward from a mapping platform. Such side looking sonar is described, for example, in copending U.S. pat application Ser. No. 707,821 filed Feb. 23, 1968, now U.S. Pat. No. 3,484,737.

One prior art solution was to be found in U.S. Pat No. 3,144,631 to H. E. Lustig, issued Aug. 11, 1964, titled, "Radiation Mapping System." U.S. Pat. No. 3,144,631 discloses the use of multiple narrow acoustic beam directed toward the ocean bottom at discrete angular spacings with respect to one another. This prior art system employs the time of arrival of echos to measure depth profiles. Advantageously, a large area could be illuminated because the conically shaped beam widths expand with increasing distance or range. Elevation changes within the beam width naturally could not be differentiated, so that only the average values of concurrent or successive time of arrival measurements could be used.

It is accordingly an object of this invention to devise a contour measuring apparatus which discriminates among contour variation within at least one dimension of an illuminating acoustic beam width.

It is accordingly another object of this invention to devise an acoustic contour measuring apparatus capable of providing selectively relative, or absolute contour variation magnitude information.

It is yet another object of this invention to devise an acoustic contour measuring apparatus capable of adaptation to a side looking mapper for measuring contour variations in broad swath widths.

SUMMARY OF THE INVENTION

The foregoing objects of this invention are satisfied in an embodiment comprising means for projecting a burst of acoustic energy at a burst center frequency $f$ in a beam having a width in at least one dimension upon the sea bottom. The embodiment further comprises receiving means having a pair of detecting phase centers responsive to the reflected signal energy and oriented in one dimension. The detecting phase centers are spaced apart by distance $d$ and are used for measuring the time varying angle of arrival $\psi(t)$ with reference to a local vertical for each portion of the acoustic pulse echo. Changes in elevation $h$ of the sea bottom with respect to a horizontal reference plan at depth $z$ within the beam width are projected as deviations of the angle of arrival $\psi(t)$ of the echo pulse from the expected variation of the angle of arrival $\psi(t)$ with time for a flat horizontal reference plane. The relative magnitude of the contour variation $[h/z]$ is thus presented as proportional to the time rate of change of the deviations of the angle of arrival from the normal variation for a flat horizontal plane. The embodiment further comprises means responsive to the time interval between pulse transmission and reception for ascertaining the perpendicular projection $z$ of the beam. Also included are correlator means coupling the receiver for generating a signal varying as $(2d/\lambda)$ $[h/z]$ cos $\psi$ $d\psi/dt$ or as $(2d/\lambda)$ $[h/z]$ sine $\psi$ $d\psi/dt$ depending on the horizontal or vertical orientation of the phase centers. The correlator means includes means for correcting the expected variation of angle $\psi(t)$ as a function of time for a horizontal, flat reference plane.

As the leading edge and the following elements of an acoustic pulse roll over a sea bottom respective portions of the pulse will be reflected at an angle $\psi(t)$ which varies as a function of time. When a sudden elevation is encountered, the reflected portions of the echo pulse are reflected at an angle $\psi(t) + \Delta\phi$ and the signals detected at the transducer phase centers will show a change in their phase relationship in a given time interval. As seen at the receiver, the variations in elevation $h$ appear as changes in the angle of arrival $\psi(t)$ as represented by the incremental angle $\Delta\phi$. Thus, the receiver signal representations of $\psi(t)$ for a flat horizontal reference plane must be subtracted from $\psi(t) + \Delta\phi$ in order to determine $\Delta\phi$.

The aforementioned and other objects and aspects of the invention will be apparent from the following description of a preferred embodiment when read in conjunction with the accompanying drawings of which the following is a brief description.

DESCRIPTION OF THE PREFERRED EMBODIMENT

The Split Beam Receiving Array

Figure 1A:
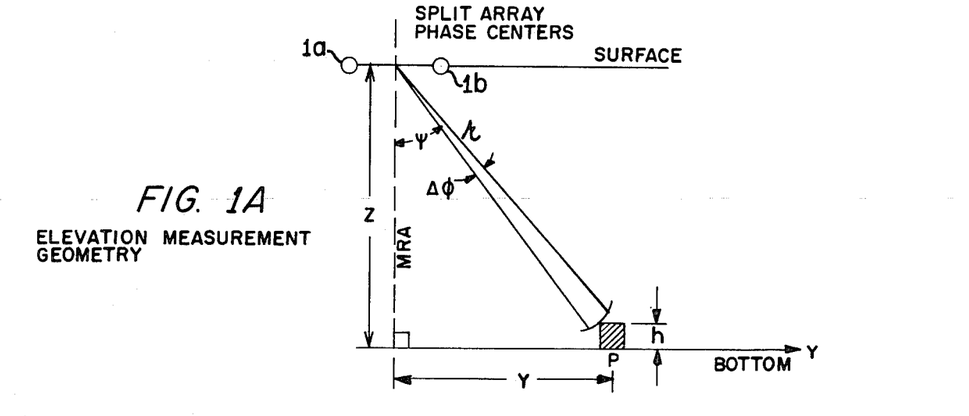
FIG. 1A shows the elevation measurement geometry between the contour measuring apparatus and the surface being measured.
Figure 1B:
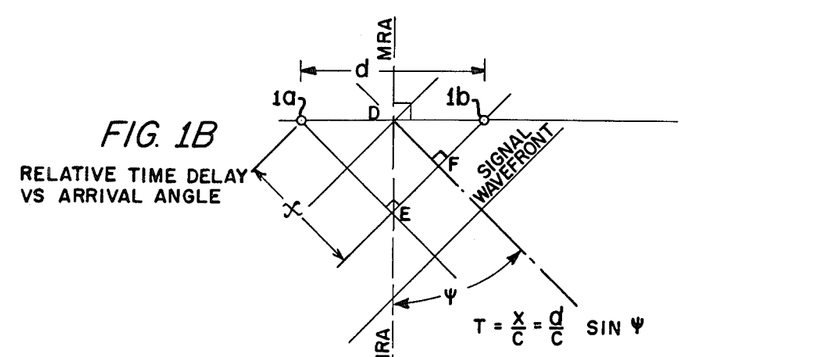
FIG. 1B shows the relative time delay versus arrival angle geometry.

Referring now to FIG. 1B of the drawing there is shown an incident reflected acoustic pulse and a pair of spaced detecting phase centers. The detecting phase centers 1a and 1b are spaced apart by a fixed distance d. An axis perpendicular and bisecting the line defined by the phase centers is designated as the main response axis MRA. The MRA may be aligned parallel to the vertical axis, or may be directed to the center of the swath desired to become illuminated.

In the far field, an acoustic beam transmitter appears as a point source generating a spherical compressional wave. Upon reflection the returning waves appear approximately planar in their phase fronts. In FIG. 1B such a planar phase front is shown incident upon the phase centers making an angle $\psi$ with respect to the MRA. The distance between the phase front incident upon 1b to the phase center 1a is represented by perpendicular x. The angle of arrival $\psi$ is related to the time or phase difference T as follows:

The angle $\overline{D\ 1b\ E}$ must equal $\psi$ by an obvious geometric construction. The time delay T (the time necessary to traverse distance x) is equal to $x/c$, where c is the acoustic velocity of propagation in the transmission medium of interest and x is equal to $d\sin\psi$. Therefore, $T = (d/c)\sin\psi$.

The sine of the angle of arrival $\psi$ is thus measureable in terms of time delay. Time delay is also seen as a phase difference between the signal incident at 1b and 1a.

The Split Beam Array Mounted on a Mapping Platform

Figure 1C:
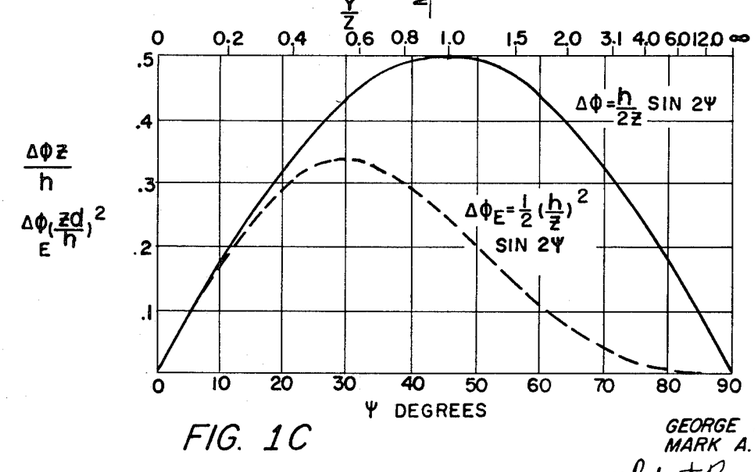
FIG. 1C is a graphical representation between the angular change with respect to elevation above the bottom plane for both the first approximation and its error term.
Figure 1D:
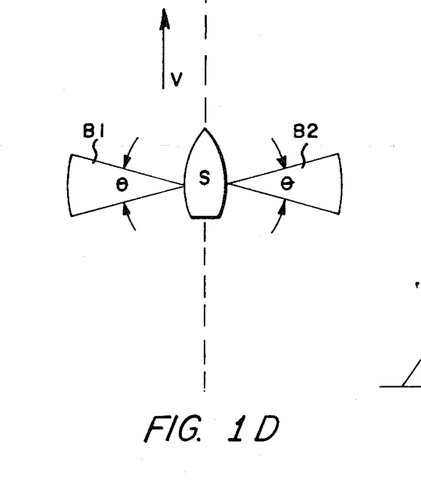
FIGS. 1D and 1E show a plan and elevation view respectively of acoustic beams projected from a platform moving relative to a surface.
Figure 1E:
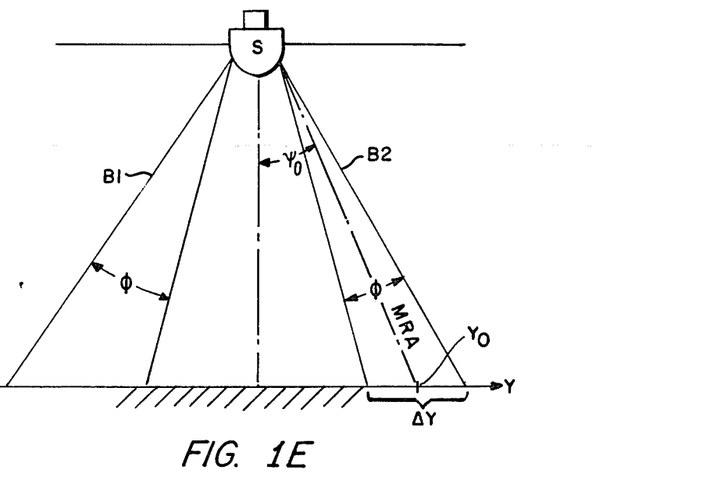

Referring now to FIG. 1D of the drawing there is shown an acoustic beam pattern B1 and B2. These beams may be projected from a transducer array mounted on ship S. A relatively narrow beam in the fore-aft (azimuth) direction may be formed perpendicular to the ship track with a beam width of angle $\theta$. This beam should be sufficiently wide in the vertical plane so as to illuminate the desired cross-track swath width with vertical beam width of angle $\phi$. This beam illuminates the cross-track swath $\Delta Y$ on each side of ship S. As the ship moves forward with velocity V a swath on each side of the ship track is swept out.

General Beam Array and Mapping Platform Operation

The invention contemplates the transmission of a periodic, short, acoustic pulse of duration $\Delta T$. This acoustic pulse travels to the ocean bottom, is reflected from the bottom terrain, and the reflected energy detected at the ship. The time of arrival of the reflected signal provides location in the cross-track direction. The ship position provides location in the along-track direction. The cross-track resolution is provided by the pulse width $\Delta T$. The along-track resolution is provided by the horizontal angular beam width $\theta$. The elevation of features is measured by the arrival angle $\psi$ of the acoustic signal in the vertical plane. It is desirable to stabilize the MRA in a vertical plane or to provide a reference measurement of the position of the MRA with respect to the vertical axis. The structure necessary for such stabilization is well known to the art and is not necessary for purposes of describing the invention.

When a pulse first reaches the sea bottom, the lower edge of the beam will be reflected first so that the arrival angle $\psi$ of the reflected signal will be a minimum. As time goes on, the pulse will sweep across the bottom, and the arrival angle $\psi$ of the received signal will go from minimum to a maximum. In order to properly appreciate a more detailed description of the preferred embodiment, consideration must be first given to the elevation angle geometry, and the angle of arrival of the echo pulse. After this, attention may be directed to the measurement of the incident echo and the extraction of contour variation information.

Elevation Angle Geometry

In this section an analytic relationship between the change in elevation angle $\Delta\phi$ and the angle of arrival $\psi$ of an acoustic echo is derived with reference to FIG. 1A of the drawing. Significantly, the elevation angle change $\Delta\phi$ is the *angular projection* of an elevation variation h. Thus, it is necessary to demonstrate how elevation variation can be reflected as variations in arrival angle.

Referring now to FIG. 1A the split array phase centers 1a and 1b are shown mounted horizontally. They may be incorporated in any mapping platform operable on the surface of the water, under the surface of the water, or in the air above a surface. They may be mounted with a horizontal, vertical, or intermediate orientation. The angle of arrival $\psi$ is measured with reference to the MRA of the acoustic beam. The perpendicular depth distance is represented by z between the phase centers and the sea bottom. The change in elevation angle as viewed from the receiver is $\Delta\phi$. For purposes of this exposition errors due to refraction are neglected. The elevation of height h is located at a position p. This is y units along the sea bottom from a point directly beneath the array phase centers.

Derivation

The tangent of the angle $\psi$ is equal to $y/z$. The tangent of the angle $\psi + \Delta\phi$ is equal to $y/(z-h)$.

1 Conversely, $\psi + \Delta\phi = \tan^{-1}[y/(z-h)]$    (1)
2 Also, $\psi = \tan^{-1}[y/z]$    (2)
3 Thus, $\Delta\phi = (\psi + \Delta\phi) - \psi = \tan^{-1}[y/(z-h)] - \tan^{-1}[y/z]$    (3)

The Maclaurin Series Expansion for a function $f(x)$ evaluated at point $x = 0$ is equal to 4     $f(x) = f(0) + f'(0)(x) + [f''(0)(x)^2/2!] + \cdots$    (4)

Applying this relationship to Equation (1) and letting x equal to h, then $$f(0) = \tan^{-1}\left[\frac{y}{z}\right]$$

$$f'(0)(x) = \frac{yh}{y^2 + z^2}$$

$$\frac{f''(0)(x)^2}{2} = \frac{yzh^2}{(y^2 + z^2)^2}$$

Thus, $$\tan^{-1}\left[\frac{y}{z-h}\right] \simeq \tan^{-1}\frac{y}{z} + \left[\frac{yh}{y^2+z^2}\right] + \frac{yzh^2}{(y^2+z^2)^2} + \quad (5)$$

Now if Equation (2) is subtracted from Equation (5) then, $$\Delta\phi = \frac{yh}{y^2+z^2} + \frac{yzh^2}{(y^2+z^2)^2} + \quad (6)$$

7 Let $y = r$ sine $\psi$ (7)
8 And let $z = r$ cosine $\psi$ (8)
9 Now, $r^2 = z^2 + y^2$ (9)
The first term of Equation (6) becomes
10 $\Delta\phi \approx (h/r)$ sine $\psi$ (10)
Now $r = (z/\text{cosine }\psi)$
Substituting in Equation (10) then, (11) $$\Delta\phi = \frac{h \text{ sine } \Psi}{r} = \frac{h \text{ sine } \Psi}{\frac{z}{\cos \Psi}} = \frac{h}{z} \cos \Psi \text{ sine } \Psi$$

By trigonometric identity, sine $2A = 2$ sine $A$ cosine $A$.
By multiplying the numerator and denominator of Equation (11) by 2 and substituting for sine $A$ cos $A$ the relationship now becomes
(12)    $\Delta\phi \approx (h/2z)$ sine $2\psi$
The second term of the Maclaurin Series Expansion which may be denominated the error term $\Delta\phi_e$ is then
(13)    $\Delta\phi_e \approx \frac{1}{2} [h/z]^2$ sine $2\psi$ cosine$^2 \psi$
Referring now to FIG. 1C of the drawing there is shown a plot of angle $\Delta\phi$ and angle error $\Delta\phi_e$ as a function of arrival angle $\psi$. A normalized scale of $\Delta\phi z/h$ is used for the $\Delta\phi$ relationship. A normalized scale of $\Delta\phi$ $[z/h]^2$ is used for the $\Delta\phi_e$ relationship. Generally speaking, if $h/z << 1$, then $\Delta\phi_e$ can be neglected. It is also to be observed that the angular change at a given elevation is a maximum when $\psi$ is equal to 45°.

Measurement of the Angle of Arrival

Figure 2:
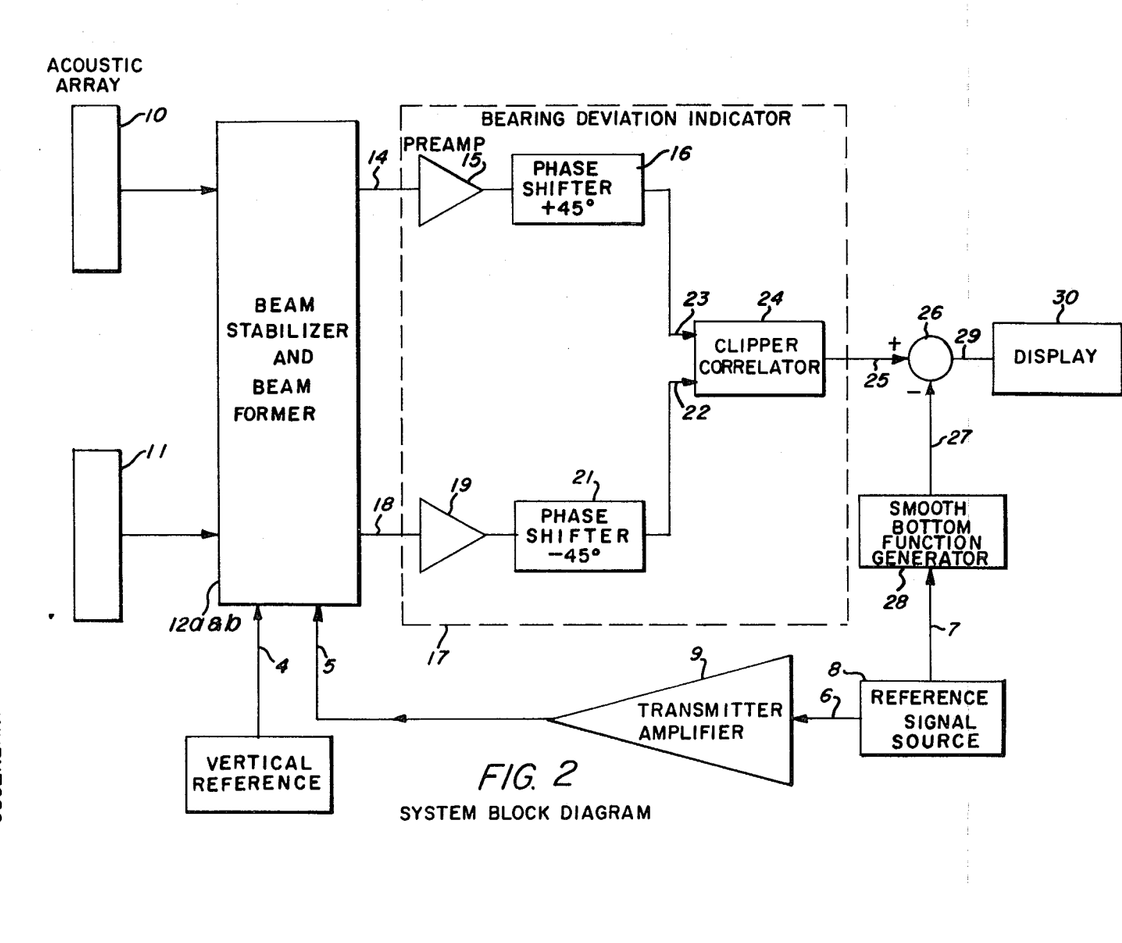
FIG. 2 is a system block diagram of the invention.

Referring now to FIG. 2 of the drawing there is shown a system block diagram. Transducers 10 and 11 correspond respectively to the detecting phase centers 1a and 1b. These transducers provide signals to the beam stabilizer and beam former 12a and 12b. Two receiving beams are formed. These beams are designated the right beam on conductor 18 and the left beam on conductor 14. Received signals within these beams drive a bearing deviation indicator (BDI) 17 which produces an output signal on line 25. The output signal is a function of the angle of arrival $\psi$, the elevation angle deviation $\Delta\phi$, and signal-to-noise ratio. The BDI may be of the clipper type as shown in detail in FIG. 5. The beam former 12a and 12b is shown in detail in FIG. 4. With these thoughts in mind the following remarks are directed to deriving the relationship between the output of the BDI 17, and the angles $\psi$ and $\Delta\phi$.

The BDI and the Angle of Arrival

The BDI comprises a correlator and means for phase shifting the received signals in one beam 90° with respect to the received signals in the other beam. It was unexpectedly discovered that the transfer function [$e$out/$a$min] (See equation (14)) of the correlator based BDI could be conveniently adapted to extract elevation variations from the echo signals.

The acoustic signal burst used to illuminate the sea bottom has an arithmetic center frequency $f$ and a signal bandwidth $W$. The output signal of the BDI is designated $e_{BDI}$. It is proportional to the time delay between the signal arrivals at the split array phase centers shown in FIGS. 1A and 1B. The time delay is more formally expressed as anti-correlation function $p(T)$. Also included in the relationship between $e_{BDI}$ and $p(T)$ is the ratio of signal power S to signal power plus noise power S+N. The relationship incorporating both S/(S+N) and $p(T)$ is:
(14)    $e_{BDI} = (2/\pi)$ sine$^{-1}[(S/S+N)p(T)]$.

In this regard, reference is made to Technical Memorandum 27 titled, "Correlators for Signal Reception" by J. J. Faran and J. R. Hills of Acoustic Research Laboratory, Harvard University, Cambridge, Mass., published on Sept. 15, 1952.

The anti-correlation function $p(T)$ may be approximated as:
(15)    $p(T) \approx [\text{sine } \pi WT/(\pi WT)]$ sine $2\pi fT$,
where T is the relative time delay between phase front arrivals at points 1a and 1b in FIG. 1B.

If $W << f$, then sine $\pi WT \approx \pi WT$. Consequently, sine $\pi WT/(\pi WT)$ approximates unity. Similarly, when the received echos are strong, as in the case in typical applications of this device, then S/(S+N) is approximately unity. Thus, Equation (14) reduces to
$e_{BDI} = [2/\pi]$ sine$^{-1}$ [sine $2\pi fT] = 4fT$ (16)
As may be recalled, T is related to the arrival angle $\psi$ by the relationship:
$T = (d/c)$ sine $\psi$. Likewise, the time delay T is related to the arrival angle $\psi + \Delta\phi$ by
$T = (d/c)$ sine $(\psi + \Delta\phi)$
The output voltage change $\Delta e_{BDI}$ from the BDI will be:
$\Delta e_{BDI} = e_{BDI} (\psi + \Delta\phi) - e_{BDI} (\psi)$ (17)
Now it will be remembered that $e_{BDI}(\psi + \Delta\phi) = 4fT = (4fd/c)$ sine $(\psi + \Delta\phi)$ Similarly, $e_{BDI} (\psi) = 4 f(d/c)$ sine $(\psi)$.

Figure 3:
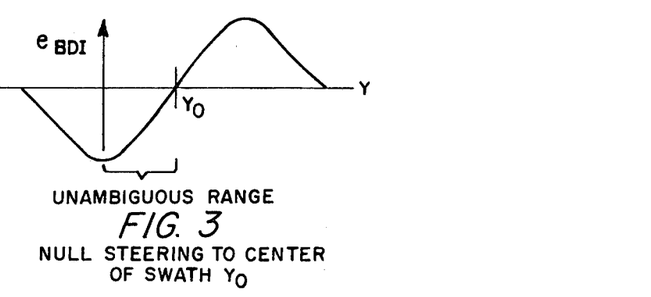
FIG. 3 shows the output voltage versus the cross range position of the bearing deviation indicator shown in FIG. 2.

Thus, $\Delta e_{BDI} = 4 f(d/c) [\text{sine } (\psi + \Delta\phi) - \text{sine } \psi]$ (18)
These trigonometric terms may be expanded such that:
sine$(\psi + \Delta\phi) -$ sine $\psi =$ sine $\psi$ cosine $\Delta\phi +$ cosine $\psi$ sine $\Delta\phi -$ sine $\psi$
If $\Delta\phi << 1$ radian, then
cosine $\Delta\phi =$ unity
Further, let sine $\Delta\phi$ approximate $\Delta\phi$ since $\Delta\phi << 1$ radian then substituting
sine $\psi +$ (cosine $\psi$) $\Delta\phi -$ sine $\psi =$(cosine $\psi$) $\Delta\phi$
A substitution may now be made in Equation (18), so that
$\Delta e_{BDI} = [4 f(d/c) \text{ cosine } \psi] \Delta\phi$ (19)
In order to relate the output signal from the BDI to the actual elevations to be measured, it will be recalled from Equation (12) that
$\Delta\phi = (h/2z)$ sine $2\psi$
Sine $\psi$ cosine $2\psi = \frac{1}{2}$ [sine $3\psi+$ sine $\psi] =$ sine $\psi$
Substituting and rearranging
$\Delta e_{BDI} \approx 2 f d(h/z)$ sine $\psi$ (20)
Referring now to FIG. 3 of the drawing, there is shown the characteristic of the BDI output voltage versus the cross-range swath Y. The point $y_0$ is the center of the swath to which the beam is steered. This point represents an operating point in the linear region of the characteristic within which it is possible to unambiguously determine both angle and sign of the incoming signal energy.

System Block Diagram

Referring now to FIG. 2 of the drawing, acoustic transducers 10 and 11 are shown coupling beam stabilizer and beam former 12a and 12b. A vertical reference source 13 supplies the stabilizing and beam former network with correction signals necessary to maintain a local vertical. The details of construction of both the beam stabilizer and vertical reference may, for example, be found in connection with copending U.S. patent application Ser. No. 707,821 filed Feb. 23, 1968, now Pat. No. 3,484,737 titled, "An Acoustic Mapping Apparatus" by George M. Walsh in connection with FIGS. 3A and 4A thereof.

Bearing deviation indicator 17 provides a voltage output on line 25 responsive to signals from the beam former applied on conductors 14 and 18. The BDI comprises a pair of phase shifters 16 and 21 interconnecting preamps 15 and 19 to clipper correlator 24 over parallel paths 23 and 22. Preamps 15 and 19 serve to isolate the BDI 17 from the beam stabilizer and beam former 12a and 12b and to adequately amplify the received signal levels. Phase shifters 16 and 21 impose a 90° phase shift between the concurrent signals on the left and right half beams. The result is to alter the characteristic curve of clipper correlator to a point where sign as well as arrival angle may be determined.

A signal source 8 is used to activate transmitter amplifier 9 coupling the beam former over conductor 5. Signal source 8 also drives a smooth bottom function generator 28. The function generator simulates the expected BDI output signal resulting from the echo return from an acoustic pulse of predetermined width reflected from a smooth horizontal surface at a known depth $z$. The smooth bottom function generator is coupled to signal summing point 26 over path 27. This summing point performs the mathematical function set forth in Equation (17). The signal difference $\Delta e_{BDI}$ between the output of the BDI and the smooth bottom function generator 28 is indicated on display 30 coupling the summing point 26 over path 29.

Apparatus Operation

In this section the embodiment shown in FIG. 2 will be described using representative parameter values.

Reference signal source 8 generates a pulse having a center burst frequency of 5 khz with a bandwidth of 300 hz. Transmitter amplifier 9 drives beam former 12a and 12b with a suitably amplified electrical signal which in turn excites transducers 10 and 11 of the acoustic array. At the same time the reference source 8 also applies the leading edge of the signal burst to the smooth bottom function generator 28 over path 7. It is parenthetically noted that in order to measure the vertical projection $z$ of the beam the time interval between transmission and reception must be known or measured.

If the minimum angle $\psi_1$ of the swath is 30°, then the maximum swath angle $\psi_2$ may be determined from the relationship:

$$\psi_2 = \tan^{-1}[(\Delta y + z \tan \psi_1)/z] \quad (21)$$

A reasonable swath width $\Delta y$ of 5,000 meters may be ascertained where, for illustrative purposes, the vertical beam projection $z$ is approximately 7,000 meters. Substituting these values in Equation (21) then the maximum angle $\psi_2$ is therefore 52°.

The ratio of the phase center separation distance $d$ to the wavelength $\lambda$ of the burst frequency necessary to avoid ambiguous measurement of the arrival angle is governed by the relationship:

$$\frac{d}{\lambda} = 1/2 \left[\frac{1}{\psi_2 - \psi_1}\right]\left[\frac{1}{\cos\left(\frac{\psi_1+\psi_2}{2}\right)}\right] \quad (22)$$

Substituting in Equation (22) where $\lambda = 0.3$ meters, $\psi_1 = 30°$ and $\psi_2 = 52°$ then $$d \approx 1.73\lambda \approx 0.52 \text{ meters} \quad (23)$$

Equation 23 represents the separation of the phase centers under the given conditions.

Now the angular center of the swath $\psi_0$ is the point at which the output voltage from the BDI for an elevation $h$ will now be determined, $\psi_0$ being equal to $(\psi_1+\psi_2)/2$.

It may be recalled from Equation (20) that $$\Delta e_{BDI} = \frac{2fdh \sin \Psi}{cz} = \frac{2(5000)(0.52)h(0.7)}{(1500)7000} = 0.35h \times 10^{-3}$$

or $0.35 \times 10^{-3}$ volts per meter of elevation.

It is next necessary to determine the accuracy with which the $e_{BDI}$ signal can be measured. The required rate of change necessary to accept the normal angular rate of change due to the sweep out of the acoustic signal across the sea bottom in the cross-track direction may be determined from the following relationship:

$$\frac{de_{BDI}}{dt}\bigg|_{\Psi=\Psi_{(max)}} = \frac{2dc \cos^3 \Psi_1}{\lambda z \sin \Psi_1} = \frac{dc(1.3)}{\lambda z} = 0.48 \text{ volts/sec.} \quad (24)$$

An integration time of one-tenth the total time taken to sweep the area is assumed, and the total sweep time is approximately 3 sec. Consequently, the integration time constant will be 0.3 sec resulting in a noise bandwidth $\Delta f \approx 1/4\tau = 0.8$ hz where $\tau$ is the time constant of a resistor capacitor integrating network.

The noise fluctuation voltage is given by the relationship:

$$\sigma_N = 0.735 [\Delta f/W]^{1/2} \quad (25)$$

The minimum observable elevation $h_{min}$ at which the BDI output voltage is equal to the RMS fluctuation noise $\sigma_N$ is governed by the relationship:

$$h_{min} = 0.735 \left[\frac{\Delta f}{W}\right]^{1/2}\left[\frac{1}{\Delta e_{BDI}}\right] = \frac{0.735}{.35(10)^{-3}}\left[\frac{\Delta f}{W}\right]^{1/2} \quad (26)$$

$$\therefore h_{min} \simeq 2.1(10)^3 \left[\frac{\Delta f}{W}\right]^{1/2}$$

Substituting accordingly, $$h_{min} \approx 2.1 \times 10^3 [0.8/300]^{1/2} = 70 \text{ meters} \quad (27)$$

The interpretation of this is that elevation contour at nominally 100-meter intervals can be observed provided that the spatial extent of the elevations is greater than 500 meters due to the integration time requirement. In actual practice, resolution will be considerably improved due to the noise suppression effects of strong signals on the BDI output.

Figure 4:
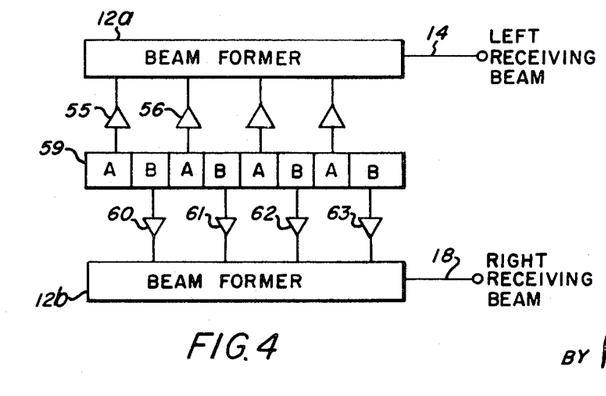
FIG. 4 is a block diagram representation of the acoustic array and beam former shown in the block diagram of FIG. 2.

Referring now to FIG. 4 of the drawing, there is shown a beam former in which a plurality of transducers 59 each is interlaced. This beam former embodiment uses overlapping beam patterns. Such overlapping patterns may be desired to avoid ambiguity problems arising from spurious side lobe returns.

Figure 5:
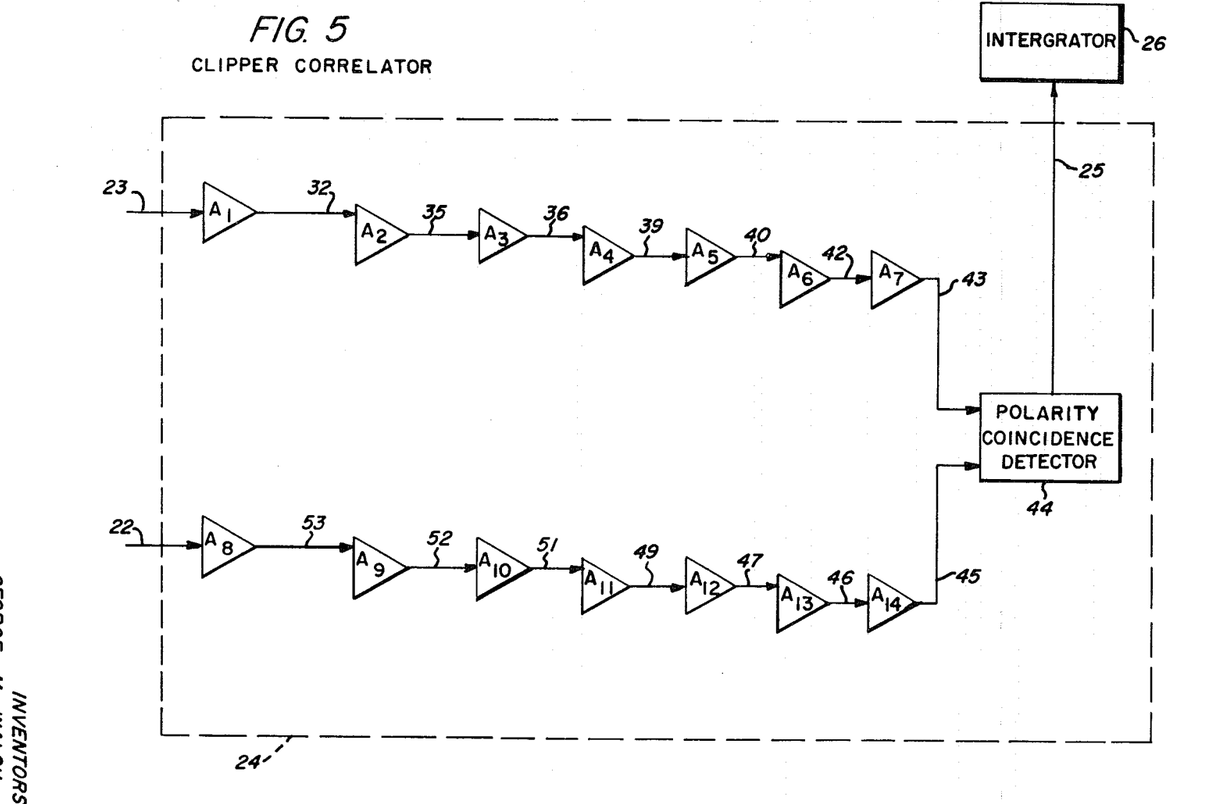
FIG. 5 is a block diagram representation of the clipper correlator shown in FIG. 2.

Referring now to FIG. 5 of the drawing, there is shown a clipper correlator of the type used with the invention. Signals correspondingly applied on path 23 and 22 drive a chain of sufficiently high gain over driven amplifiers $A_1$-$A_7$ and $A_8$-$A_{14}$ so that the signals at the end of the chain, at points 43 and 45, are substantially amplified and clipped. These signals are then applied to a polarity coincidence detector 44.

The polarity coincidence detector 44 operates according to the following truth table:

| Input on line 43 | Input on line 45 | Output on line 25 |
| --- | --- | --- |
| +1 | +1 | +1 |
| −1 | −1 | +1 |
| +1 | −1 | −1 |
| −1 | −1 | −1 |

The truth table may be generalized and shown to be a logical NOR gate. Thus, if the inputs are designated A and B and the output as C then,

| A | B | C |
| --- | --- | --- |
| 1 | 1 | 1 |
| 0 | 0 | 1 |
| 0 | 1 | 0 |
| 1 | 0 | 0 |

A correlator broadly integrates two inputs A and B over a period of time. Integrator means 26 are provided at the polarity coincidence detector output. Thus, its integrated output is designated $$\int_0^t AB \, dt.$$

Consequently, the output from line 25 must terminate in a capacitive or other type of integrator (26). This frequently takes the form of a low pass filter. More complete reference for the construction of clipper correlators may be found in the article, "Correlators for Signal Reception" by J. J. Faran, Jr. and J. R. Hills, Technical Memorandum No. 27, Acoustic Research Laboratory of the Harvard University in Cambridge, Mass., dated Sept. 15, 1952.

Conclusions

When an acoustic pulse is projected upon a surface, and as the leading edge and the following pulse elements roll over the surface, then respective portions of the pulse will be reflected at an angle $\psi(t)$ which varies as a function of time. When a sudden elevation is encountered, the reflected portions of the echo pulse are reflected at an angle $\psi(t)+\Delta\phi$ and the signals detected at the transducer phase centers will show a sharp change in their phase relationship in a given time interval. As seen at the acoustic receiver, the variations in elevation h appear as changes in the angle of arrival $\psi$ as represented by the incremental angle $\Delta\phi$. Thus, the receiver signal representation of $\psi$ must be subtracted from $\psi(t)+\Delta\phi$ in order to determine $\Delta\phi$. This may be achieved through the use of a correlation type BDI having a transfer characteristic capable of being adapted to measure the events of interest.

It is believed that the operation of the above-described apparatus will be apparent from the foregoing description. While the apparatus has been described as being suitable for contour measurement while measuring the sea bottom, it will be obvious that various changes and modifications may be made therein without departing from the spirit and scope of the invention, as defined in the annexed claims.

We claim:

1. In combination:
   means for directing energy towards a surface from a point displaced from said surface;
   means responsive to energy reflected from said surface for measuring a predetermined temporal function of the angle of arrival of said reflected energy;
   means for synthesizing a reference signal, said synthesizing means varying said reference signal in accordance with a predetermined temporal function, said temporal function being representative of energy reflected from a predetermined surface; and
   means for forming the difference between said reference signal and said measurement of the predetermined temporal function of the angle of arrival.

2. The apparatus of claim 1 further comprising means for displaying said difference.

3. An apparatus for measuring the angular projection $\Delta\phi$ of an elevation h along a surface contour from a distance z comprising:
   means for acoustically illuminating the surface with a pulsed beam;
   receiving means for measuring a predetermined function of the time varying angle of arrival $\psi(t)+\Delta\phi$ of each portion of the acoustic pulse echo;
   a function generator for synthesizing a signal varying as a predetermined function of the time varying angle of arrival $\psi(t)$ of an equivalent acoustic pulse echo reflected from a reference flat plane at the distance z; and
   means for subtracting the synthesized function of signal $\psi(t)$ from the time varying measured function of signal $\psi(t)+\Delta\phi$.

4. An apparatus for measuring the angular projection $\Delta\phi$ of an elevation h along a surface contour from a distance z comprising:
   means for projecting a burst of acoustic energy at velocity c upon the surface at burst frequency f in a beam having a width in at least one angular dimension;
   receiving means having a pair of detecting phase center means oriented in the angular dimension and spaced apart by a distance d for measuring the sinusoid of the time varying angle of arrival $\psi(t)+\Delta\phi$ of each portion of the acoustic pulse echo, the measured signal varying as $(fd/c)\sine[\psi(t)+\Delta\phi]$;
   a function generator for synthesizing a signal varying as the sinusoid of the time varying angle of arrival $\psi(t)$ of an equivalent acoustic pulse echo reflected from a reference flat plane at distance z, the synthesized signal varying as $(fd/c)\sine \psi(t)$; and
   means for subtracting the synthesized signal from the measured signal to form another signal varying as $(fd/c)[\sine \psi(t)]\Delta\phi$.

5. An apparatus according to claim 4, wherein the receiving means comprise:
   a first and second signal path including a preamplifier and phase shifter in series;
   a correlator means for providing signal indication output of the product of signal appearing on the first and second signal paths; and an integrator coupling the correlator means.

6. An apparatus according to claim 5, wherein the first and second signal paths each comprise a chain of high gain amplifiers; and a polarity coincidence detector having a first output signal indication when signals appearing on the first and second paths match and a second output signal indication when the signals mismatch.

7. A sea bottom slope contour mapping apparatus comprising:

means for projecting a pulsed coherent beam of acoustic energy upon the sea bottom, the beam having a width in at least one angular dimension;

receiving means having a pair of spaced apart phase detecting centers oriented in the one angular dimension for forming a first and second receiving beam;

correlator means to which the first and second receiving beams are applied for generating a signal proportional to a sinusoidal function of the time delay between signal arrivals at the first and second phase centers;

a function generator for synthesizing a signal representative of a base plane contour and varying as a sinusoidal function of the angle of arrival of an equivalent acoustic pulse echo reflected from a reference flat plane at a predetermined distance;

a comparison network coupling the correlation means and the function generator for forming a signal varying as the difference between the sinusoidal function of the measured signal and the sinusoidal function generated by the function generator; and a utilization circuit coupling the comparison network.

8. In a system for the slope contour mapping of an area at a distance $z$ from a mapping station moving over said area, the system including means for transmitting a beam of energy upon the area from the mapping station, and receiving means for measuring a predetermined function of the time varying angle of arrival $\psi(t) + \Delta\phi$ of each portion of the received energy echo; the combination comprising:

a function generator for synthesizing a signal varying as a predetermined function of the time varying angle of arrival $\psi(t)$ of an equivalent energy echo reflected from a reference flat plane at the distance $z$; and means for subtracting the synthesized function of signal $\psi(t)$ from the time varying measured function of signal $\psi(t) + \Delta\phi$.

* * * * *